(12) United States Patent
Katsura (10) Patent No.: US 7,336,893 B2
(45) Date of Patent: Feb. 26, 2008

(54) LENS-FITTED PHOTOGRAPHIC FILM UNIT

(75) Inventor: Hirofumi Katsura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 337 days.

(21) Appl. No.: 11/230,541

(22) Filed: Sep. 21, 2005

(65) Prior Publication Data

US 2006/0062556 A1    Mar. 23, 2006

(30) Foreign Application Priority Data

Sep. 21, 2004    (JP)    ............................. 2004-272960

(51) Int. Cl.
  *G03B 17/00*    (2006.01)
  *G03B 17/02*    (2006.01)
(52) U.S. Cl. .......................................... 396/6; 396/543
(58) Field of Classification Search .................... 396/6, 396/70, 281, 535, 543
  See application file for complete search history.

(56) References Cited

U.S. PATENT DOCUMENTS 6,633,728 B2 * 10/2003 Motomura ..................... 396/6
6,714,728 B2 * 3/2004 Moriya et al. ................. 396/6

FOREIGN PATENT DOCUMENTS

JP    11-064951    3/1999
JP    2003-344914    12/2003

* cited by examiner

*Primary Examiner*—Rodney Fuller
(74) *Attorney, Agent, or Firm*—Young & Thompson (57) ABSTRACT

A mode selection member is moved to the lowest position for selecting a daylight mode, which is most frequently used, the middle position for selecting a middle mode for photographing outdoors under the overcast sky, or the highest position for selecting an indoor mode for photographing indoors. When the mode selection lever is in the middle position or the highest position, the upper end of a mode indicating plate protrudes from a unit body. When the mode indicating plate is pushed down into the unit body, the mode selection lever is forced to return to the lowest position to set the daylight mode.

9 Claims, 6 Drawing Sheets

FIG.1

FIG.2A (DAYLIGHT MODE)

FIG.2B (MIDDLE MODE)

FIG.2C (INDOOR MODE)

LENS-FITTED PHOTOGRAPHIC FILM UNIT

BACKGROUND OF THE INVENTION

1. Field of the Invention

The present invention relates to a lens-fitted photographic film unit capable of changing an aperture in accordance with a photography mode.

2. Background Arts

A variety of lens-fitted photographic film units with preloaded photographic films have been on the market. Some of them are provided with flash devices integrated therein so as to be capable of photographing in a dark place. There also is the lens-fitted photographic film unit of a mode changeover type that enables to change an EV (exposure value) in accordance with a photographing condition by selecting a photography mode so as to photograph both in a bright place and in the dark place. This lens-fitted photographic film unit of the mode changeover type uses a high speed photographic film for the purpose of improving the description of the background photographed in the dark place (Japanese Patent Laid-Open Publication Number 11-64951).

The lens-fitted photographic film unit with the flash device is preloaded with the photographic film of ISO800 and has a shutter speed at 1/140 minute and an aperture value of f10, so as to have a correct EV at 10.8 with reference to ISO100. It is thus possible to correctly expose a main subject within a relatively short distance by emitting the flash light at nighttime or in the dark place such as an indoor place.

Although such lens-fitted photographic film unit with the flash device can photograph the main subject at an approximately correct exposure by emitting the flash light, it causes extreme under-exposure of the background where beyond the reach of the flash light.

A lens-fitted photographic film unit of mode changing type is known to be provided with a shutter speed changing mechanism and a stop changeover mechanism in addition to the flash device, and has the high speed photographic film preloaded therein (Japanese Patent Laid-Open Publication Number 2003-344914). This lens-fitted photographic film unit has three photography modes: a daylight mode (no flash light) for photographing in the bright place such as an outdoor place in daylight, a daylight flash mode (with flash light), and a night flash mode for photographing in the dark place by emitting the flash light to the main subject and describing the background at suitable density.

A high shutter speed and a small aperture are employed in the daylight mode and the daylight flash mode stated above, while a low shutter speed and a large aperture are employed in the night flash mode. The photographic film of ISO800 is preloaded in this lens-fitted photographic film unit. The shutter speed is predetermined to be at, for example, 1/120 sec and the aperture value is predetermined to be, for example, f14 in the daylight mode and the daylight flash mode. In the night flash mode, the shutter speed is predetermined at, for example, 1/45 sec and the aperture value is predetermined to be, for example, f5.6.

However, the lens-fitted photographic film unit of mode changing type has a problem of that it is hard to know the selected photography mode from its appearance. In order for the user to be able to easily observe the selected mode, the lens-fitted photographic film unit with the flash device disclosed in Japanese Patent Laid-Open Publication Number 11-64951 protrudes a light guide, which displays charging condition of the flash circuit, from the top face of a camera body in a flash photography mode.

In addition, the lens-fitted photographic film unit of mode changing type disclosed in Japanese Patent Laid-Open Publication Number 2003-344914 indicates the selected photography mode by giving no sign in the daylight photography mode, protruding the light guide from the top face of the camera body in the daylight flash mode, and inserting an index plate in front of a front viewfinder window in the night flash mode.

However, if the user forgets to change the photography mode and photographs with the lens-fitted photographic film unit of mode changing type, the photographing is performed in the photography mode set in the previous photographing. It is likely for the user to forget to change the photography mode before photographing, since a photography mode selection lever of the above lens-fitted photographic film unit is provided on the front face of the camera body. As for the lens-fitted photographic film unit disclosed in Japanese Patent Laid-Open Publication Number 11-64951, even photographing in inappropriate photography mode does not have a substantial influence on the exposure, since the difference between the two modes are only whether emitting the flash light or not. However, photographing in an improper photographing mode with the lens-fitted photographic film unit disclosed in Japanese Patent Laid-Open Publication Number 2003-344914 can result in failure, as the exposure is changed based on the photography mode.

SUMMARY OF THE INVENTION

A main object of the present invention is to provide a lens-fitted photographic film unit that can reduce failure in photographing caused by miss-selection of a photography mode.

Another object of the present invention is to provide the lens-fitted photographic film unit that can be quickly set in the photography mode most frequently used.

In order to achieve the above objects and other objects, the lens-fitted photographic film unit of the present invention is provided with an interlocking mechanism for reversibly interlocking a mode selection member and a mode indicating member. The mode selection member moves between a first position for selecting a first photography mode and a second position for selecting a second photography mode. The first photography mode is used more frequently than the second photography mode and has less exposure amount. The mode indicating member moves between a first protruding position to partially protrude from the top face of a unit body and a retracting position to retract in the unit body. The interlocking mechanism moves the mode indicating member from the retracting position to the first protruding position in response to the movement of the mode selection member from the first position to the second position. When the mode indicating member is pushed down from the first protruding position to the retracting position, the interlocking mechanism forces the mode selection member to move from the second position to the first position.

The photo film of ISO 1600 or more is preloaded in the unit body. The first photography mode is a daylight mode for photographing in daylight, and a correct EV (exposure value) is between 8.5 and 11.5 for ISO 100.

In a preferred embodiment of the present invention, the mode selection member moves further to a third position for selecting a third photography mode, and the mode indicating member moves farther to a second protruding position protruding from the first protruding position. The exposure amount in the third photography mode is much more than that in the second photography mode. The second photography mode is a middle mode for photographing outdoors under the overcast sky, while the third photography mode is an indoor mode for photographing indoors. The correct EV for ISO 100 is 7 in the second photography mode and 4.5 in the third photography mode. The mode indicating member is provided with a first indicia indicating the middle mode and a second indicia indicating the indoor mode. The first indicia becomes observable when the mode indicating member is set in the first protruding position, while the second indicia, in addition to the first indicia, becomes observable when the mode indicating member is set in the second protruding position. The mode selection member is held in the first position, the second position or the third position by a click mechanism.

The present invention promotes that a user set the most frequently used photography mode, since the user notices and pushes down the mode indicating member. It is thus reduced for the user to photograph in a wrong photography mode. Moreover, it is possible to quickly set the most frequently used photography mode only by pushing down the mode indicating member, without directly operating the mode selection member.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
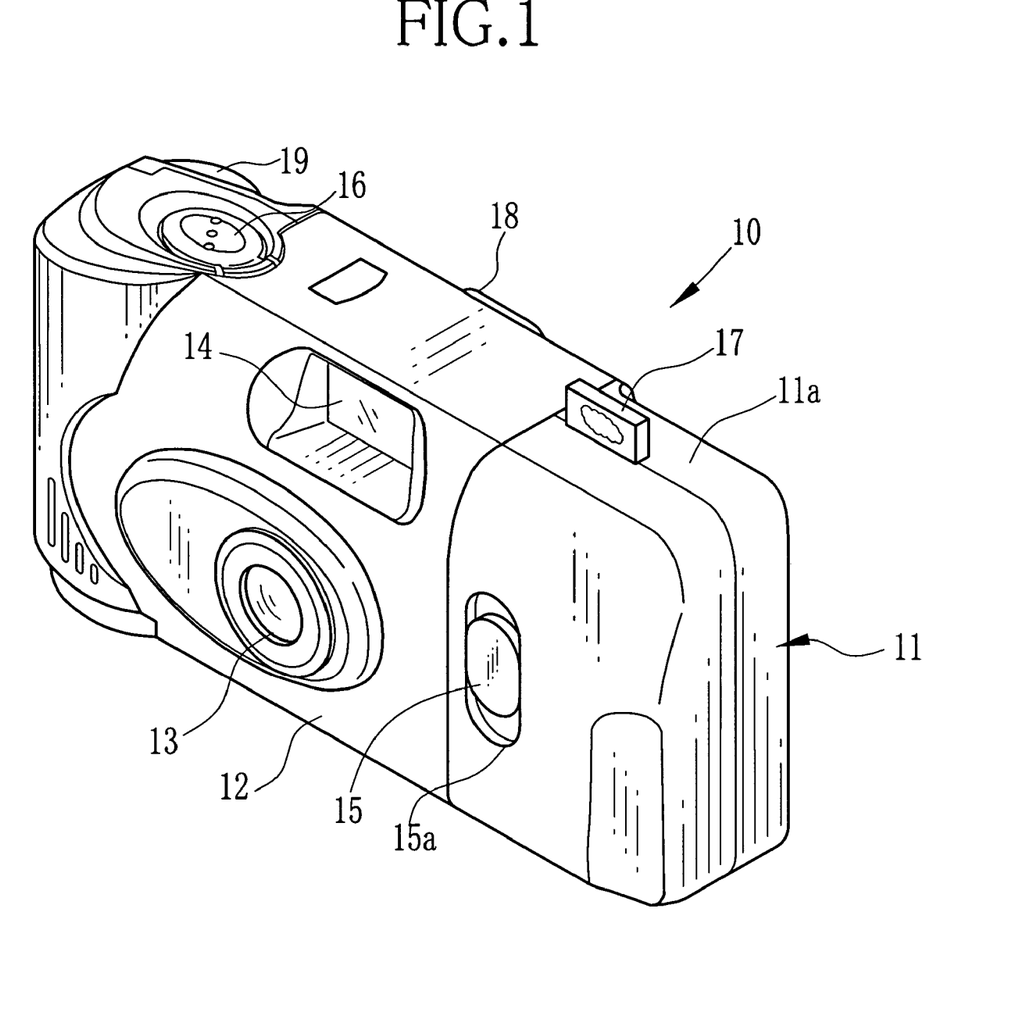
FIG. 1 is a perspective view illustrating an exterior view of a lens-fitted photographic film unit of the present invention.

As shown in FIG. 1, a lens-fitted photographic film unit 10 of the present invention comprises a unit body 11 with a variety of photographing mechanism incorporated therein, and a label 12 adhered to around the periphery of the unit body 11. The label 12 has openings for exposing various parts of the unit body 11.

The front face of the unit body 11 is provided with a taking lens 13, a front viewfinder window 14, and a mode selection lever 15. The top face 11a of the unit body 11 is provided with a shutter release button 16 and a mode indicating plate 17. The rear face of the unit body 11 is provided with a rear viewfinder window 18 and exposes a part of a film winding wheel 19 which is used for winding up an exposed frame.

Figure 2A:
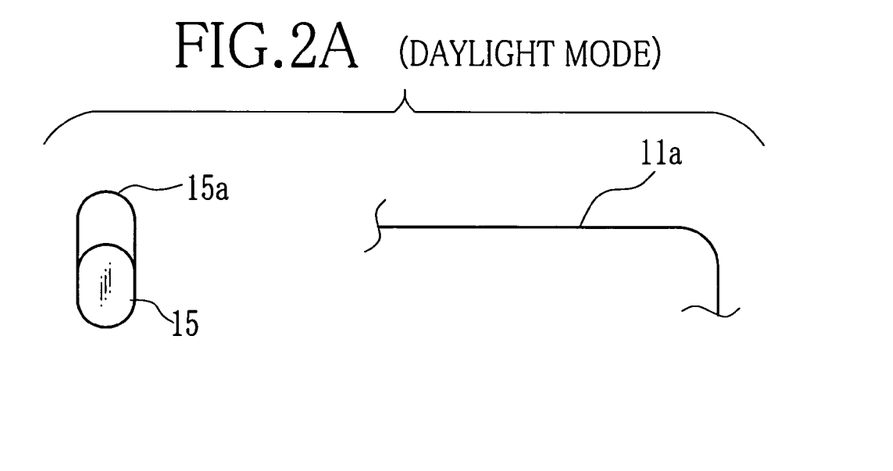
FIG. 2A to FIG. 2C are explanatory views illustrating relations between positions of a mode selection lever and conditions of a mode indicating plate.

The mode selection lever 15 is provided to be slidable up and down within a slot 15a to be selectively set in one of a first, a second and a third potion. As shown in FIG. 2A, the first position locates at the bottom within the slot 15a and selects a daylight mode for photographing a subject with high intensity, such as for daylight photographing. The daylight mode is predetermined to be a standard mode, as it is used most frequently. In the daylight mode, the mode indicating plate 17 is in a retracting position inside the unit body 17.

Figure 2B:
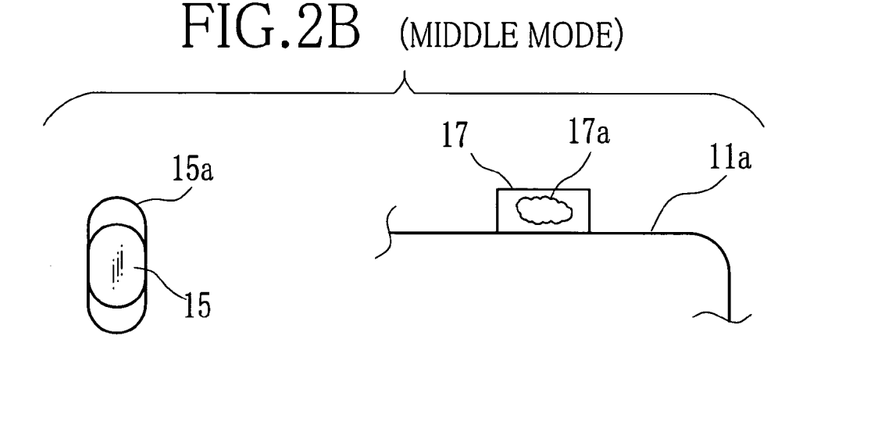
Figure 2C:
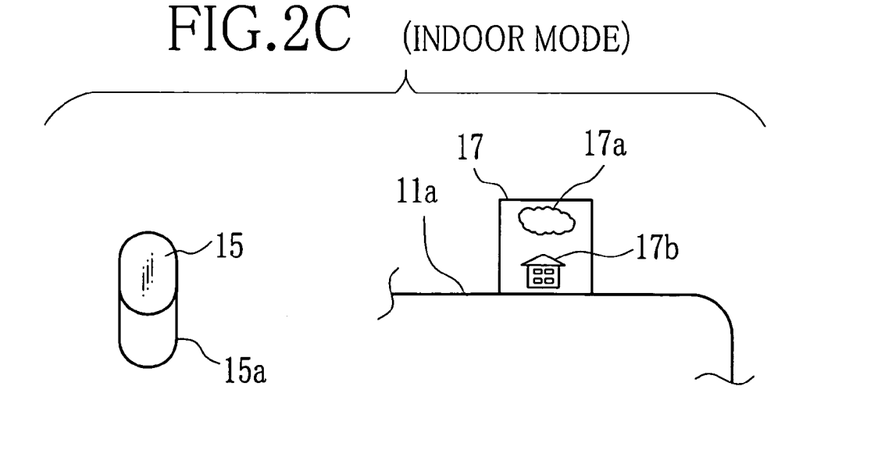

The second position locates at the middle within the slot 15a for selecting a middle mode for photographing the subject with medium intensity, such as for photographing outdoors under the overcast sky. In the middle mode, the mode indicating plate 17 protrudes for one step from the top face 11a of the unit body 11, displaying an indicia of cloud 17a provided on the front surface or the rear surface of the mode indicating plate 17. The third position locates at the top within the slot 15a for selecting an indoor mode for photographing the subject with low intensity, such as for photographing indoors. In the indoor mode, the mode indicating plate 17 protrudes for one more step, that is, two steps from the top face 11a of the unit body 11 and displays an indicia of home 17b provided on the front surface or the rear surface of the mode indicating plate 17. Note that any indicia indicating the photography mode can be used as 17a and 17b.

Figure 3:
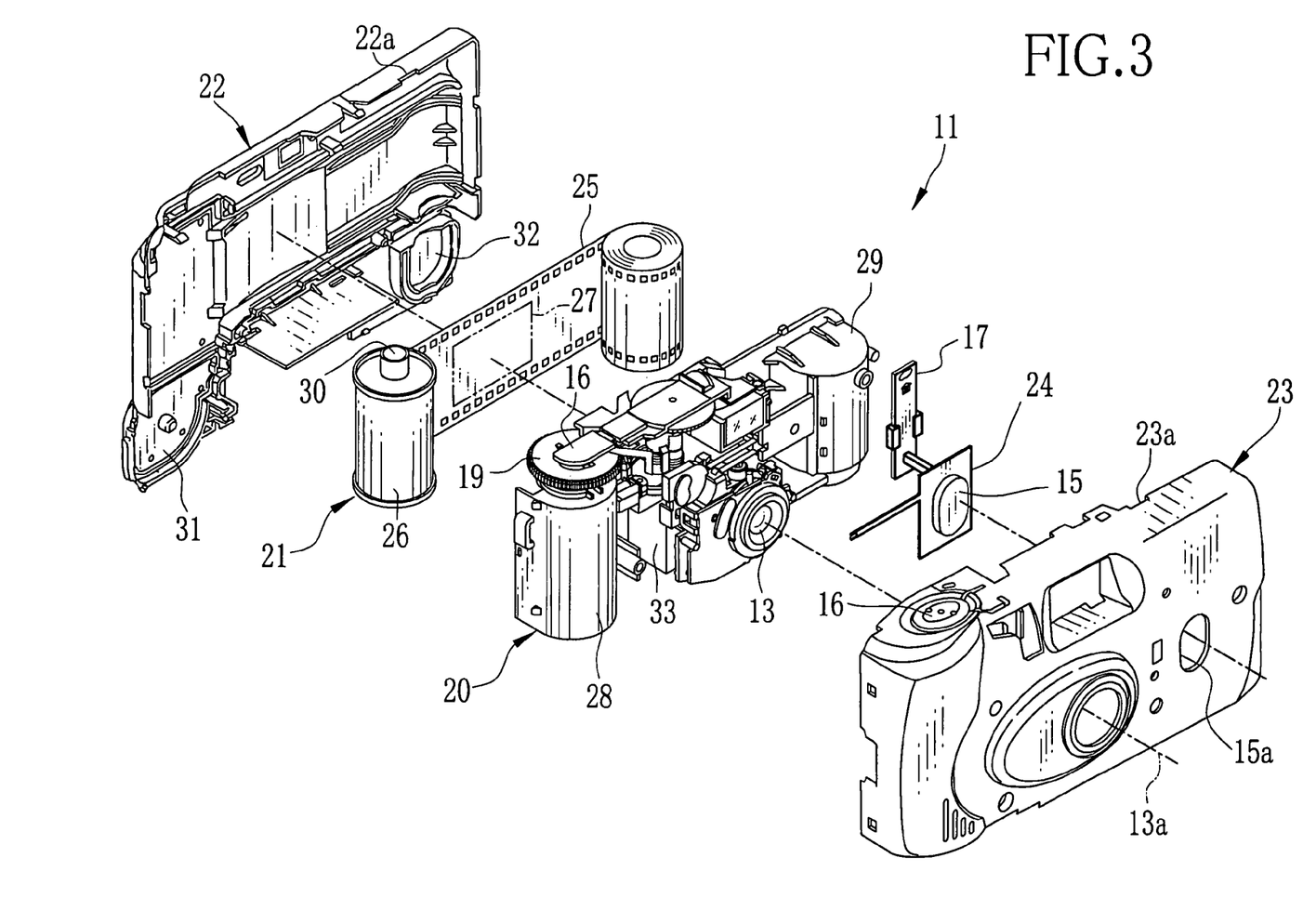
FIG. 3 is an exploded perspective view illustrating construction of a unit body.

As shown in FIG. 3, the unit body 11 comprises a body base 20, a photographic film cartridge 21, a rear cover 22, and a front cover 23. The photographic film cartridge 21 comprises a photo film 25 and a cartridge 26 for containing the photo film 25. The photographic film 25 is of more than ISO 1600, preferably ISO 3200. The top faces of rear cover 22 and the front cover 23 are provided with cutouts 23a and 22a respectively, for moving the mode indicating plate 17 in and out thereof.

A cartridge chamber 28 for containing the cartridge 26 is provided one side of an exposure opening 27, while a film roll chamber 29 for containing a roll of unexposed photo film 25 drawn from the cartridge 26 is provided on the other side of the exposure opening 27. A film winding wheel 19 is rotatably provided on top of the cartridge chamber 28. The film winding wheel 19 engages with a spool 30 of the cartridge 26 loaded in the cartridge chamber 28 and, when rotated in a film winding direction, feeds the photo film 25 from the film roll chamber 29 to the cartridge chamber 28 and winds the exposed frame of the photo film 25 into the cartridge 26.

It is open at the rear side of the body base 20 and the bottom sides of the cartridge chamber 28 and the film roll chamber 29. The rear cover 22 is attached to the rear side of the body base 20 after the photographic film cartridge 21 is loaded. The rear cover 22 is provided with bottom lids 31 and 32 that are thin and able to bend for covering the bottom of the cartridge chamber 28 and the bottom of the film roll chamber 29, respectively. The bottom lid 31 for covering the bottom of the cartridge chamber 28 is opened when the cartridge 26 containing the exposed photo film is removed in a photofinishing laboratory.

A dark box 33 is provided in front of the exposure opening 27. The taking lens 13, a shutter mechanism, and a stop changeover mechanism are provided in front of the dark box 33.

Figure 4:
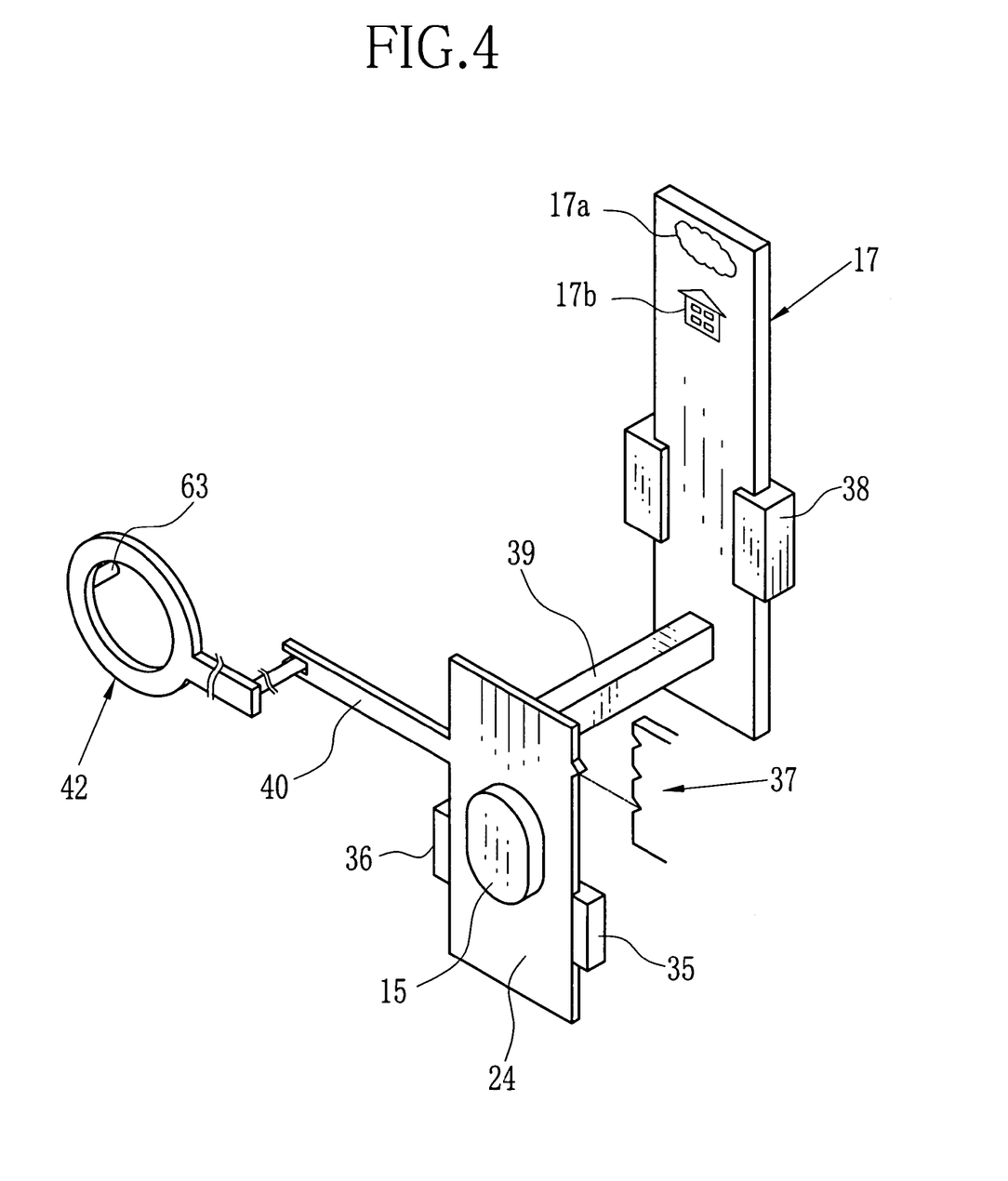
FIG. 4 is a perspective view illustrating the mode selection lever, the mode indicating plate, and a stop changeover mechanism.

As shown in FIG. 4, the mode selection lever 15 is integrally formed with the operating plate 24. The operating plate 24 is supported by a pair of guide members 35 and 36, which are provided on the inner surface of the front cover 23, to be slidable up and down. A well-known click mechanism 37 with an indented side is provided on the operating plate 24 and the inner wall of the front cover 23, for securely holding the mode selection lever 15 in any of the first, the second or the third position.

The mode indicating plate 17 slides up and down as guided by a guide member 38 provided in the unit body 11. The mode indicating plate 17 is connected to the operating plate 24 via a connecting rod 39. Accordingly, the mode indicating plate 17 is retracted inside the unit body 11 when the mode selection lever 15 is in the first position, and protruded from the top face 11a of the unit body 11 when the mode selection lever 15 is in the second and the third position. In addition, when the mode indicating plate 17 is pushed down, the operating plate 24 moves down as well to return the mode selection lever 15 to the first position. The operating plate 24 is provided with an arm 40 connected to the stop changeover mechanism. Although the operating plate 24 and the mode indicating plate 17 is connected by the connecting rod 39, it is possible to provide a well-known link mechanism and a connecting mechanism between the operating plate 24 and the mode indicating plate 17.

Figure 5:
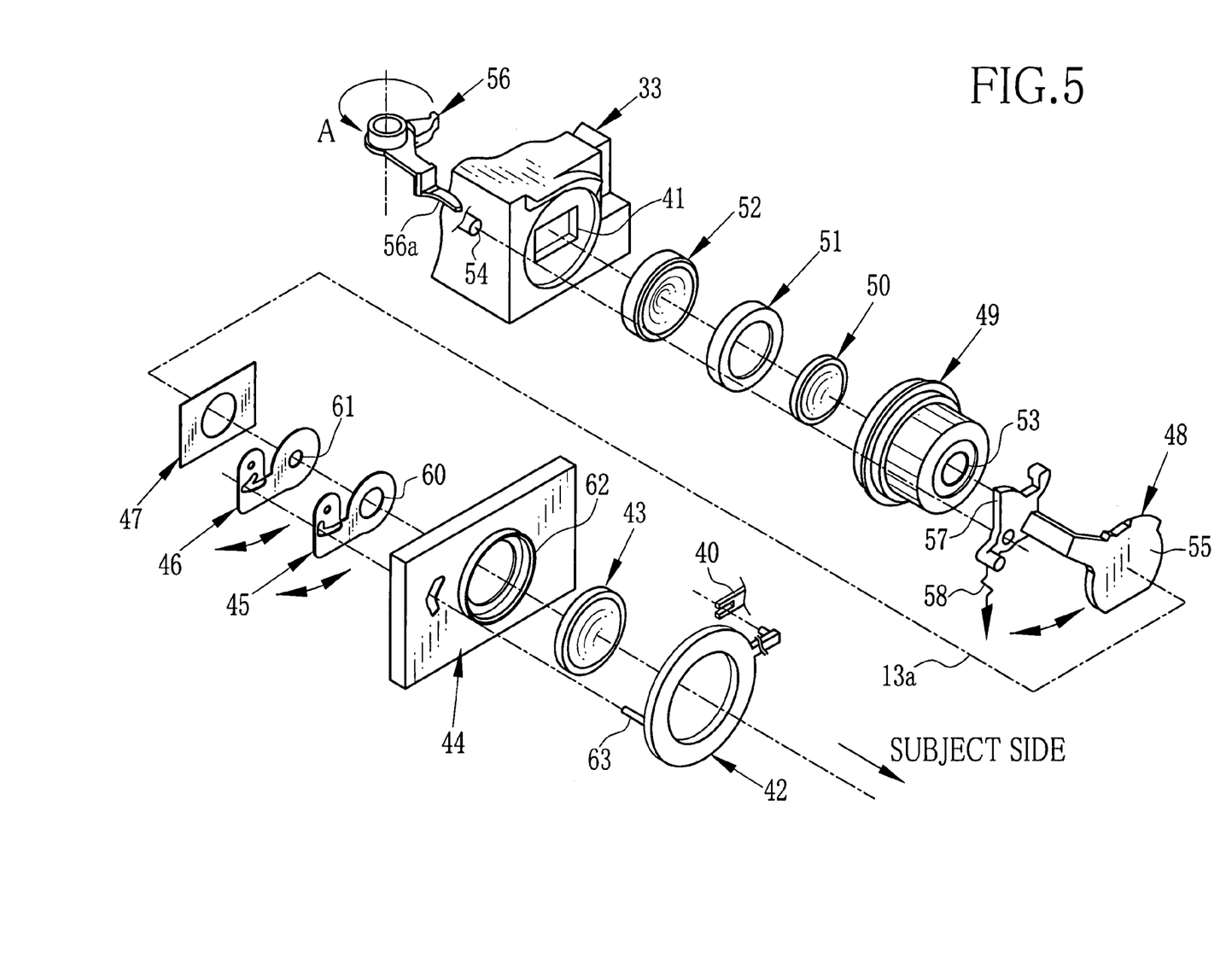
FIG. 5 is a perspective view illustrating positional relationship among a taking lens, the stop changeover mechanism, and a shutter blade.

As shown in FIG. 5, an opening 41 is formed on the front face of the dark box 33 for guiding subject light to the exposure opening 27. A cam ring 42, a first lens 43, a lens holding plate 44, a first movable aperture stop plate 45, a second movable aperture stop plate 46, a spacer 47, a shutter blade 48, a lens barrel 49, a second lens 50, a spacer ring 51, and a third lens 52 are disposed in front of the opening 41 from the subject side in the stated order.

The first lens 43 is supported within the lens holding plate 44. The second and the third lenses 50 and 52 and the spacer ring 51 are supported within the lens barrel 49. The lens barrel 49 is provided with a full open aperture 53 on the front face thereof, and an opening for inserting the second and the third lenses 50 and 52 and the spacer ring 51 thereinto.

The shutter blade 48 is provided between the first lens 43 and the lens barrel 49 to be swingable across a photography optical axis 13a. That is, having one end being fit on a pin 54 provided on the dark box 33, the shutter blade 48 swings about the pin 54 to open and close the full open aperture 53 with a light shielding portion 55 at the other end of the shutter blade 48. The shutter blade 48 swings when a ledge 57 is kicked by a kicking portion 56a of a shutter driving lever 56 rotating in the A direction, which is shown by an arrow, in response to shutter release. After reaching an opening position, the shutter blade 48 is returned to a closing position for closing the full open aperture 53 by a spring 58.

The spacer 47 is attached to the rear side of the lens holding plate 44, and between them the first and the second movable aperture stop plates 45 and 46 are removably provided. The first movable aperture stop plate 45 is provided with a middle aperture 60 smaller than the full open aperture 53, and swings between an inserted position to set the middle aperture 60 on the photography optical axis 13a and a removed position to set the middle aperture 60 away from the photography optical axis 13a. The second movable aperture stop plate 46 is provided with a small aperture 61 smaller than the middle aperture 60 and swings behind the first movable aperture stop plate 45 between the inserted position to set the small aperture 61 on the photography optical axis 13a and a removed position to set the small aperture 61 away from the photography optical axis 13a.

A fixed barrel 62 is formed on the front face of the lens holding plate 44 for supporting the first lens 43. The cam ring 42 is rotatably put on the periphery of the fixed barrel 62. The cam ring 42 is provided with a pin 63 on the periphery thereof for engaging with each end of the first and the second movable aperture stop plates 45 and 46 in order to selectively move the first and the second movable aperture stop plates 45 and 46 by its rotating angle.

The cam ring 42 is connected to the arm 40 for rotating in response to the operation of the mode selection lever 15. When the mode selection lever 15 is set in the first position, the cam ring 42 is rotated by the arm 40 so as to move the first movable aperture stop plate 45 to the removed position and the second movable aperture stop plate 46 to the inserted position. Accordingly, the small aperture 61 is used in the daylight mode. When the mode selection lever 15 is set in the second position, the cam ring 42 rotates by the large angle than that of when the mode selection lever 15 is set in the first position in conjunction with the mode selection lever 15, so as to move the first movable aperture stop plate 45 to the inserted position and the second movable aperture stop plate 46 to the removed position. Accordingly, the middle aperture 60 is used in the middle mode. When the mode selection lever 15 is set in the third position, the cam ring 42 rotates by the larger angle than that of when the mode selection lever 15 is set in the second position, so as to move both the first and the second movable aperture stop plates 45 and 46 to their removed positions. Accordingly, the full stop aperture 53 is used in the indoor mode.

Figure 6:
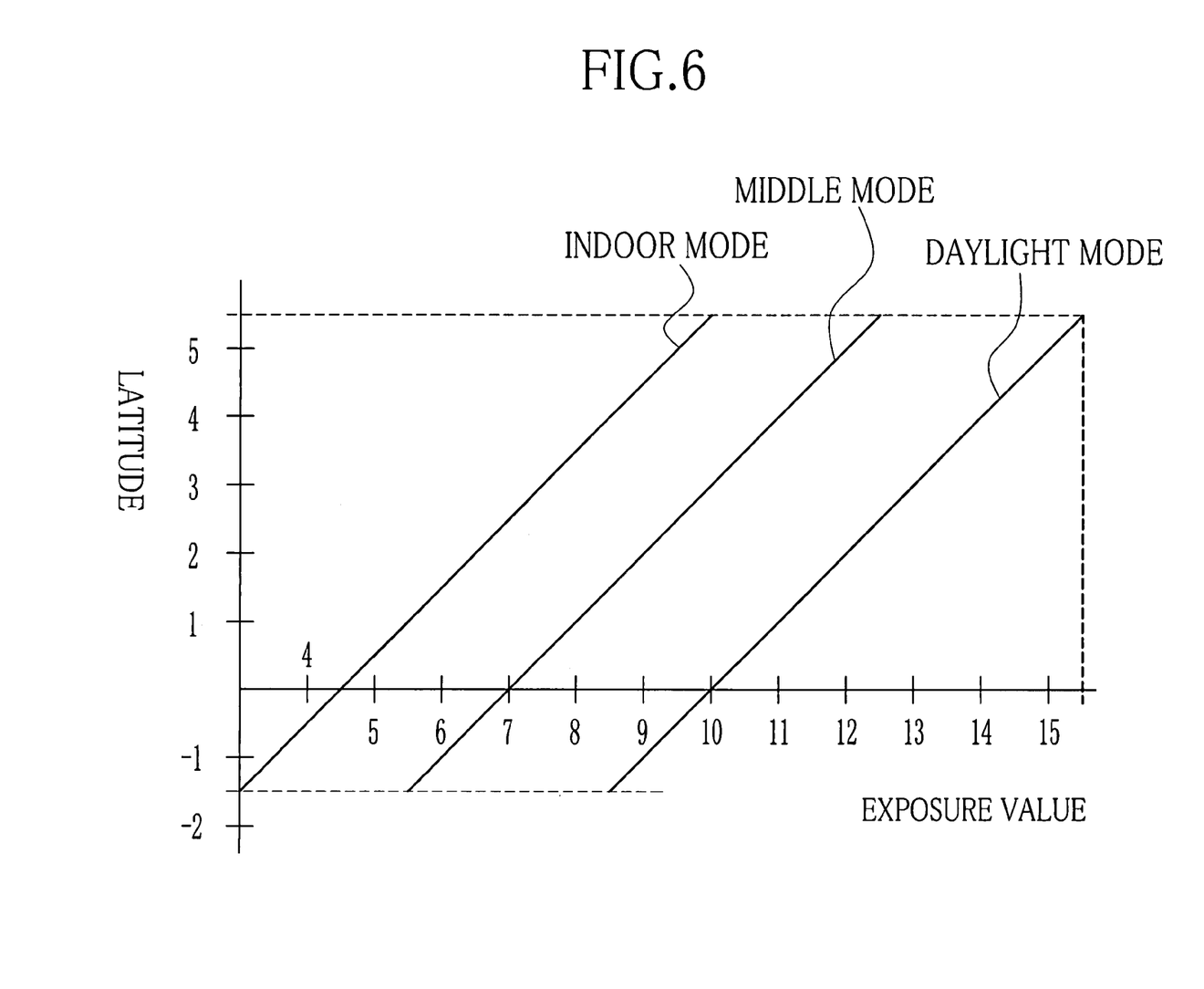
FIG. 6 is a graph showing ranges of correct exposure values with reference to ISO 100 in each photographing mode considering latitude of a photo film.

As shown in FIG. 6, a correct EV for ISO 100 is "10" in the daylight mode. When permitting +5.5 EV (over-exposure) and −1.5 EV (under-exposure) in view of the latitude of the photo film 22b of color negative type, photographing can be performed with EV 8.5 to 15.5. In the middle mode, the correct EV is "7", and photographing can be performed with EV 5.5 to 12.5 in view of the latitude. It is thus possible to photograph outdoors under the overcast sky without the flash light. In the indoor mode, the correct EV is "4.5", and photographing can be performed with EV 3.0 to 10.0 in view of the latitude. It is thus possible to photograph without the flash light in a dark room or an outdoor place at nighttime. Note that the correct EV with reference to ISO 100 is calculated by the following formula: "$EV=\log_2(f^2/T)-\log_2(S/100)$," provided that the "f", the "T (sec)" and the "S" represent the aperture value, the shutter speed, and the film speed, respectively.

Although the correct EV for the daylight mode is determined to be "10" in the above embodiment using the photo film of ISO 1600 or more, preferably ISO 3200, the correct EV can be determined arbitrarily to be between 8.5 and 11.5.

The following is an explanation of the operation of the above construction. In photographing, the mode selection lever 15 is selectively set in one of the positions for the daylight mode, for the middle mode and for the indoor mode, in accordance with the photographing condition. In order to photograph in daylight, the mode selection lever 15 is set in the lowest position within the slot 15a to select the daylight mode. The mode indicating plate 17 is thus retracted inside the unit body 11. In addition, the cam ring 42 rotates in response to the operation of the mode selection lever 15 and moves the first movable aperture stop plate 45 to the removed position and the second movable aperture stop plate 46 to the inserted position. Accordingly, photographing is performed using the small aperture 61.

In order to photograph outdoors under the overcast sky, the mode selection lever 15 is set in the middle position within the slot 15a to select the middle mode. The mode indicating plate 17 thus protrudes for one step from the top face 11a of the unit body 11 and displays the indicia of cloud 17a. In addition, in response to this operation the first movable aperture stop plate 45 and the second movable aperture stop plate 46 are moved to the inserted position and the removed position, respectively. Accordingly, photographing is performed using the middle aperture 60.

In order to photograph indoors or at nighttime, the mode selection lever 15 is set in the highest position within the slot 15*a* to select the indoor mode. The mode indicating plate 17 thus protrudes for two steps from the top face 11*a* of the unit body 11 and displays the indicia of home 17*b* as well as the indicia of cloud 17*a*. In addition, in response to this operation both the first and the second movable aperture stop plates 45 and 46 are moved to the removed positions. Accordingly, photographing is performed using the full open aperture 53. Note that the mode selection lever 15 is returned to the position for selecting the daylight mode when the mode indicating plate 17 is pressing down to the retracted position after photographing in either the medium brightness mode or the indoor mode. In conjunction with this operation, the first and the second movable aperture stop plates 45 and 46 are moved to the removed position and the inserted position, respectively.

Note that although the mode selection lever 15 of the above embodiment slides vertically, it can be designed to slide horizontally or move in an arc around the taking lens.

Note that it is also possible to provide only two or more than three photographing modes in the present invention. In both cases, the daylight mode, which is the most frequently used mode, is predetermined as the standard mode. In addition, although the mode indicating plate 17 of the above embodiment protrudes from the top face 11*a*, it can be designed to protrude from a rear face, a bottom face, or a side face of the unit body 11.

Although an exposure changeover mechanism employed in the above embodiment is the stop changeover mechanism, it is also possible to change the shutter speed, or both the shutter speed and the aperture stop for changing the exposure by combining various sizes of the aperture and the shutter speed. In addition, the mode indicating plate 72 can be not only a plate but also any shape such as, for example, a prismatic shape.

In addition, it is possible to use a program shutter mechanism, in which two shutter blades are disposed to be open and close on the photography optical axis and the aperture is formed in accordance with the open amount by each shutter blade.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A lens-fitted photographic film unit having an unexposed photo film preloaded in a unit body, comprising:
    a mode selection member for moving at least between a first position for selecting a first photography mode and a second position for selecting a second photography mode, said first photography mode being used the most frequently, said second photography mode being used less frequently, an exposure amount in said first photography mode being less than that in said second photography mode;
    a mode indicating member for moving between a first protruding position to partially protrude from said unit body and a retracted position to be retracted in said unit body; and
    an interlocking mechanism for moving said mode indicating member in conjunction with said mode selection member, for setting said mode indicating member in said retracted position when said mode selection member being in said first position and setting said mode indicating member in said first protruding position when said mode selection member being in said second position, and for forcing said mode selection member to move from said second position to said first position when said mode indicating member being pushed down from said first protruding position to said retracted position.

2. A lens-fitted photographic film unit defined in claim 1, wherein said photo film has a film speed of ISO 1600 or more.

3. A lens-fitted photographic film unit defined in claim 2, wherein a correct EV for the film speed of ISO 100 is in a range of 8.5 to 11.5 in said first photography mode.

4. A lens-fitted photographic film unit defined in claim 3, wherein said first photography mode is a daylight mode for photographing in daylight.

5. A lens-fitted photographic film unit defined in claim 4, wherein said mode selection member moves farther to a third position for selecting a third photography mode, said mode indicating member moves farther to a second protruding position protruding from said first protruding position, the exposure amount in said third photography mode is more than that in said second photography mode.

6. A lens-fitted photographic film unit defined in claim 5, wherein said second photography mode is a middle mode for photographing outdoors under the overcast sky, and said third photography mode is an indoor mode for photographing indoors.

7. A lens-fitted photographic film unit defined in claim 6, wherein the correct EV for the film speed of ISO 100 is "7" in said second photography mode and "4.5" in said third photography mode.

8. A lens-fitted photographic film unit defined in claim 6, wherein said mode indicating member is provided with a first indicia for indicating said middle mode and a second indicia for indicating said indoor mode, said first indicia becomes observable when said mode indicating member is set in said first protruding position, said second indicia in addition to said first indicia becomes observable when said mode indicating member is set in said second protruding position.

9. A lens-fitted photographic film unit defined in claim 8, further including a click mechanism for supporting said mode selection member in each position from said first position to said third position.

* * * * *